United States Patent
Distelrath

[11] Patent Number: 5,203,230
[45] Date of Patent: Apr. 20, 1993

[54] CRANKSHAFT FOR AN INTERNAL-COMBUSTION ENGINE

[75] Inventor: Winfried Distelrath, Stuttgart, Fed. Rep. of Germany

[73] Assignee: Ing. h. c. F. Porsche AG, Fed. Rep. of Germany

[21] Appl. No.: 783,691

[22] Filed: Oct. 29, 1991

[30] Foreign Application Priority Data

Oct. 29, 1990 [DE] Fed. Rep. of Germany ....... 4034384

[51] Int. Cl.$^5$ ............................................... F16C 3/04
[52] U.S. Cl. ......................................... 74/595; 74/596
[58] Field of Search .................... 74/595, 596, 597, 598

[56] References Cited

U.S. PATENT DOCUMENTS

| | | | |
|---|---|---|---|
| 1,901,358 | 3/1933 | Ryder | 74/596 |
| 4,356,741 | 11/1982 | Schöpf et al. | 74/595 |
| 4,881,427 | 11/1989 | Yasutake | 74/595 |

FOREIGN PATENT DOCUMENTS

| | | |
|---|---|---|
| 714558 | 12/1941 | Fed. Rep. of Germany . |
| 2240 | 7/1950 | Fed. Rep. of Germany . |
| 1763633 | 3/1958 | Fed. Rep. of Germany . |
| 1189802 | 3/1965 | Fed. Rep. of Germany ........ 74/595 |
| 42896 | 11/1965 | Fed. Rep. of Germany . |
| 1076058 | 8/1974 | Fed. Rep. of Germany . |
| 2706072 | 8/1978 | Fed. Rep. of Germany . |
| 3614722 | 11/1987 | Fed. Rep. of Germany . |

*Primary Examiner*—Rodney H. Bonck
*Assistant Examiner*—Ryan W. Massey
*Attorney, Agent, or Firm*—Evenson, McKeown, Edwards & Lenahan

[57] ABSTRACT

A crankshaft for an internal-combustion engine has crankshaft webs provided with recesses. The recesses are molded into the crankshaft webs in each case symmetrically with respect to a vertical longitudinal center plane oppositely within a clear outer contour of the crankshaft webs. In the area of the recesses, the sections are constructed as a U-shaped profile with side legs. Between the recesses of the crankshaft webs arranged above one another, a reinforcing rib is arranged in the overlapping area of the crank pin and the journal. As a result of the recesses in each crankshaft web which are arranged in a targeted manner, a reduction in weight is made possible with effective mass compensation. The recesses are arranged above one another such that in the endangered area of each crankshaft web, a cross-section is built up that is as large as possible and can absorb the flexural and torsional load in a defined manner, despite the maximally large recesses.

9 Claims, 4 Drawing Sheets

CRANKSHAFT FOR AN INTERNAL-COMBUSTION ENGINE

BACKGROUND AND SUMMARY OF THE INVENTION

The invention relates to a crankshaft for an internal-combustion engine and, more particularly, to a crankshaft having webs with recesses.

German Patent Document DE-OS 36 14 722 shows a crankshaft for an internal-combustion engine having crankshaft webs with recesses on each side. These recesses are arranged such that a maximal web thickness remains in the overlapping area of the journal and the crank pin.

It is an object of the present invention to provide a crankshaft which ensures improved flexural and torsional loads while optimizing mass compensation.

This object has been achieved in accordance with the present invention by providing recesses molded into the crankshaft webs in each case symmetrically with respect to a vertical longitudinal center plane oppositely inside a clear outer contour of the crankshaft webs which, in the area of the recesses, are constructed as a profile with side legs which has a U-shaped cross section. A reinforcing rib is arranged between the recesses of the crankshaft webs which are arranged above one another, in the overlapping area of the crank pins and the journals.

Principal advantages achieved by the present invention are that, as a result of the recesses arranged in each crankshaft web in a targeted manner, a weight reduction is made possible with effective mass compensation. In particular, the recesses are arranged above one another such that, in the endangered area of each crankshaft web, despite the maximally large recesses, a cross-section is built up which is as large as possible to absorb the flexural and torsional load in a defined manner.

In each crankshaft web, the recesses form a U-profile which is aligned in the longitudinal planes of the web and which promotes an optimal torsional and flexural load in the most endangered zone.

The large cross-section between the two recesses is achieved by a reinforcing rib which has its highest elevation in the area of the overlapping between the journal and the crank pin.

The construction of the recesses, or their shape and size, may differ according to the constructive circumstances in the directly opposite crankshaft webs. Thus, it is advantageous for the recesses to be relatively large in the area of the crank pin so that the rotating mass part is reduced which results in a more favorable mass compensation while the weight is reduced at the same time. In the case of a 4-cylinder crankshaft, without laid-in cores, these measures can be carried out simply as a cast part and a forged part.

The opening angle of the counterweight of the crankshaft web may be calculated corresponding to the rotating mass. The opening angle of the counterweight of the crankshaft web is optimized with respect to a relative optimum for a minimal weight with a maximally possible mass compensation. With respect to an angle of 180°, the values for the ideal angle are at 19.4% weight reduction and 4.6% unbalance loss.

BRIEF DESCRIPTION OF THE DRAWINGS

These and other objects, features and advantages of the present invention will become more apparent from the following detailed description of currently preferred embodiments when taken in conjunction with the accompanying drawings wherein.

DETAILED DESCRIPTION OF THE DRAWINGS

Figure 1:
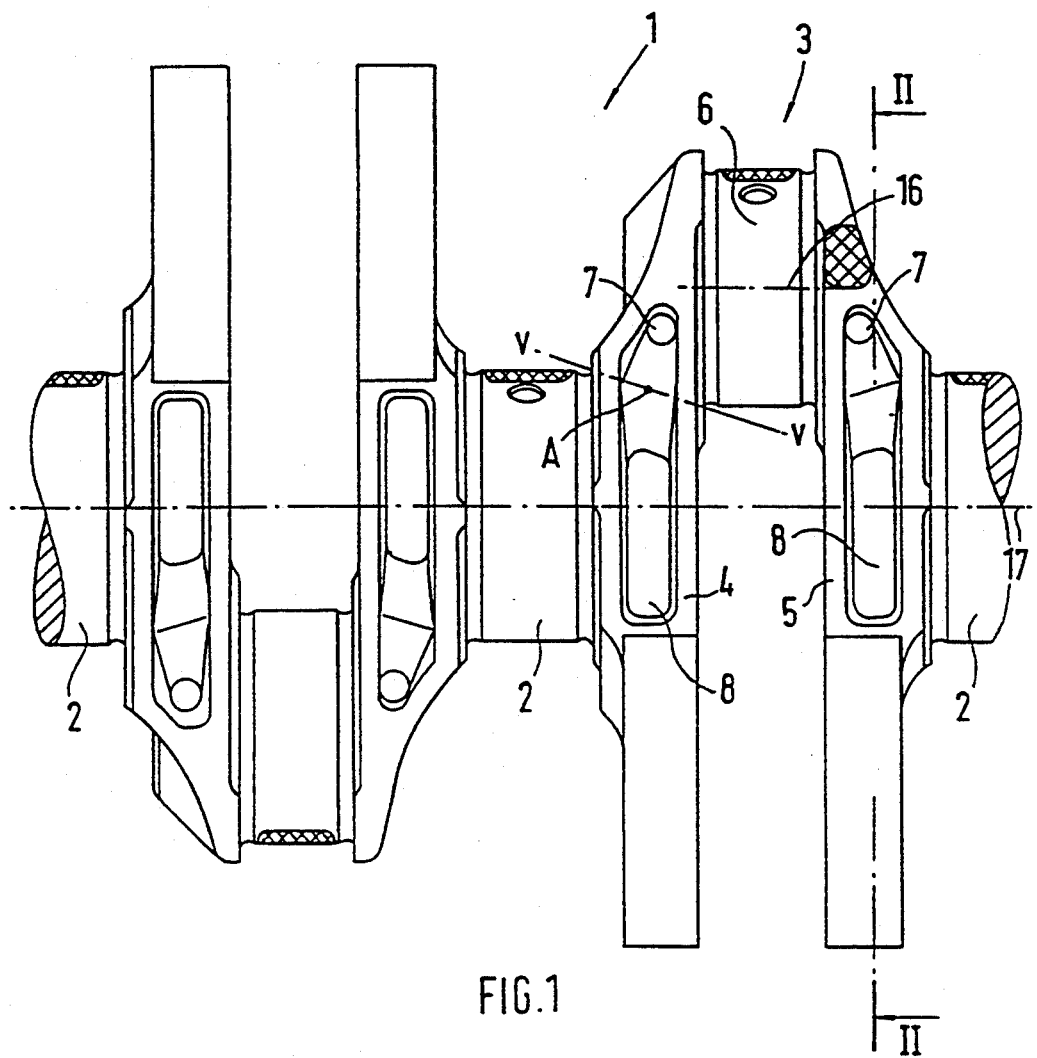
FIG. 1 is an elevational side view of a portion of a crankshaft with recesses arranged above one another, with respect to the longitudinal axes, in the crankshaft webs.

A crankshaft designated generally by numeral 1 of an internal-combustion engine comprises essentially cranks 3 projecting from journals, with each crank 3 comprising a crank pin 6 connecting two crankshaft webs 4. In each crankshaft web 4, 5 of the crankshaft 1, two recesses 7 and 8, respectively, are arranged above one another, with respect to the longitudinal axis, and are separated by a reinforcing rib 9 as shown in FIG. 2.

Figure 2:
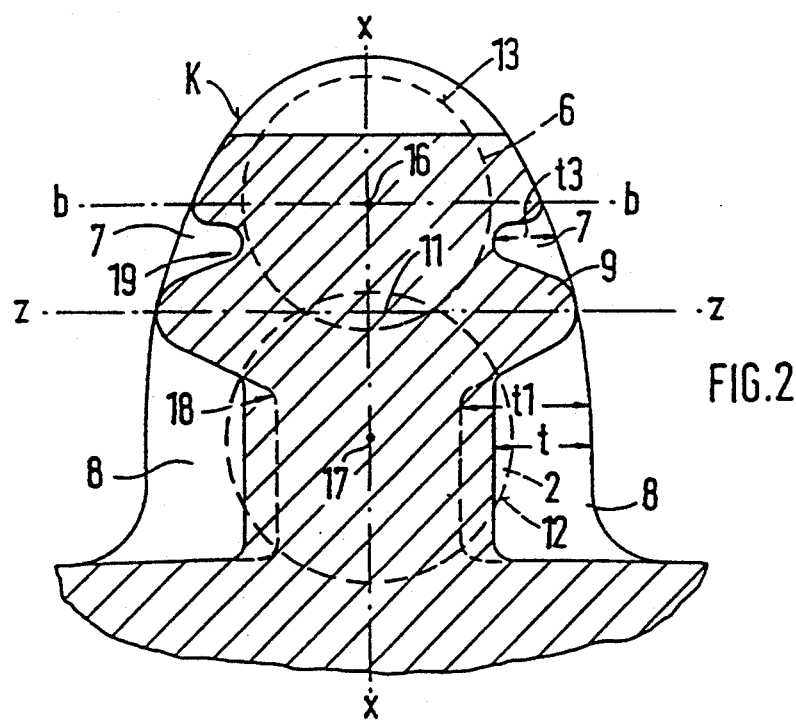
FIG. 2 is a cross-sectional view along line II—II of FIG. 1 of a crankshaft web in a connecting rod bearing rotated above a journal.
Figure 3:
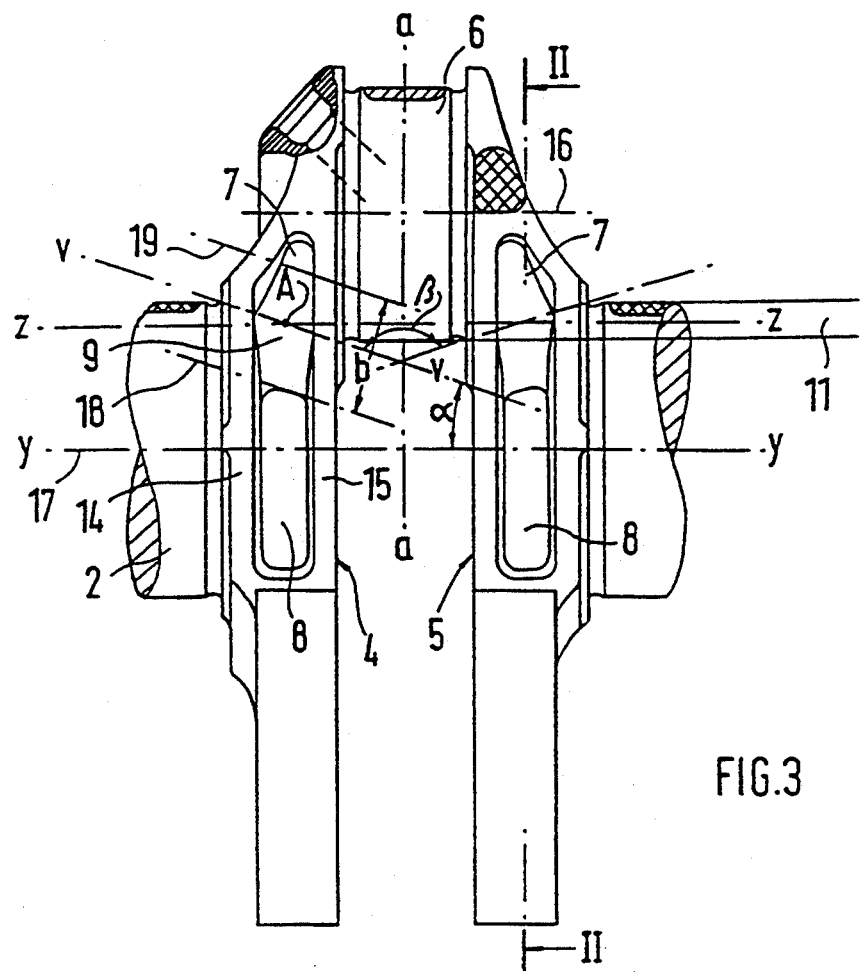
FIG. 3 is a frontal view of a cutout portion of the crankshaft with recesses in the crankshaft webs.

As shown in greater detail in FIGS. 2 and 3, the two recesses 7 and 8 form so-called flutes and extend in the vertical longitudinal planes of the crankshaft webs 4 and 5, that is, transversely with respect to the journals 2 of the crankshaft 1.

The first recess 8 has a larger volume than the second recess 7 and is arranged in the area of the journal 2. The second recess 7 of the smaller volume is situated in the area of the crank pin 6. The reinforcing ribs 9 arranged between the two recesses 7, 8 are provided in the overlapping area 11 of the journal 2 and the crank pin 6.

The first recess 8 may be of varying depths t and t1, which project into the outer contour 12 of the journal 2. The second recess 7 has a depth t3 which ends at the level of the outer contour 13 of the crank pin 6.

The respective recesses 7, 8 in the crankshaft webs 4, 5 are each arranged symmetrically with respect to a vertical longitudinal center plane x—x (FIG. 2) and end in the clear outer contour K of the crankshaft webs 4, 5. The recesses 7, 8 form a generally U-profile with side legs 14, 15 in the webs.

The first recess 8 is arranged on both sides of a horizontal center transverse plane y—y (FIG. 3) extending through the journal 2, and the second recess 7 is arranged below a plane b—b extending through the center axis 16 of the crank pin 6. The reinforcing rib 9 between the two recesses 7, 8 extends preferably to the outer contour K of the crankshaft web 4, 5 and has a maximal width b.

The recess 8 extends almost by one half on both sides of the horizontal plane y—y placed through the longitudinal axis 17 of the journal 2. The other recess 7 extends, with respect to the bearing axis 16 of the crank pin 6, slightly below the horizontal plane b—b placed through this axis. A third horizontal plane z—z extends between these two planes y—y and b—b and through the overlapping area 11 of the journal 2 and the crank pin 6. In this plane z—z, the reinforcing rib 9 is arranged with its highest point A which is set at an angle α with respect to the axis 17 of the journal 2 and extends in the diagonal plane v—v. The horizontal projection lines 18, 19 of the lateral surfaces of the recesses 8 and 7 and of the reinforcing rib 9 extend in parallel with respect to this plane v—v.

The planes v—v of the two crankshaft webs 4 and 5 meet at an obtuse angle β in a vertical plane a—a placed through the crank pin 6.

Figure 4:
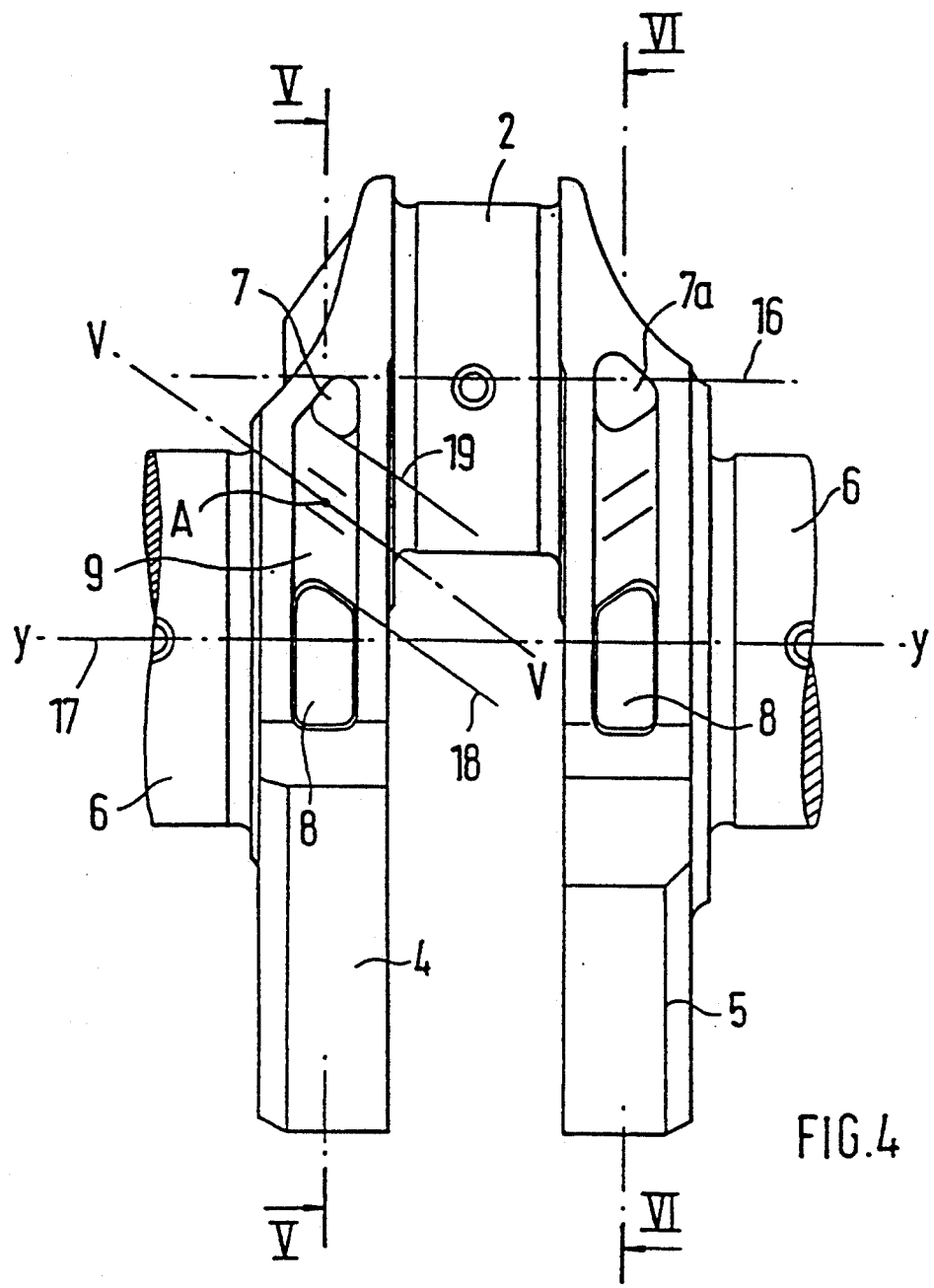
FIG. 4 is another embodiment of crankshaft webs with recesses of different sizes in the area of the crank pin according to the present invention.
Figures 5, 6:
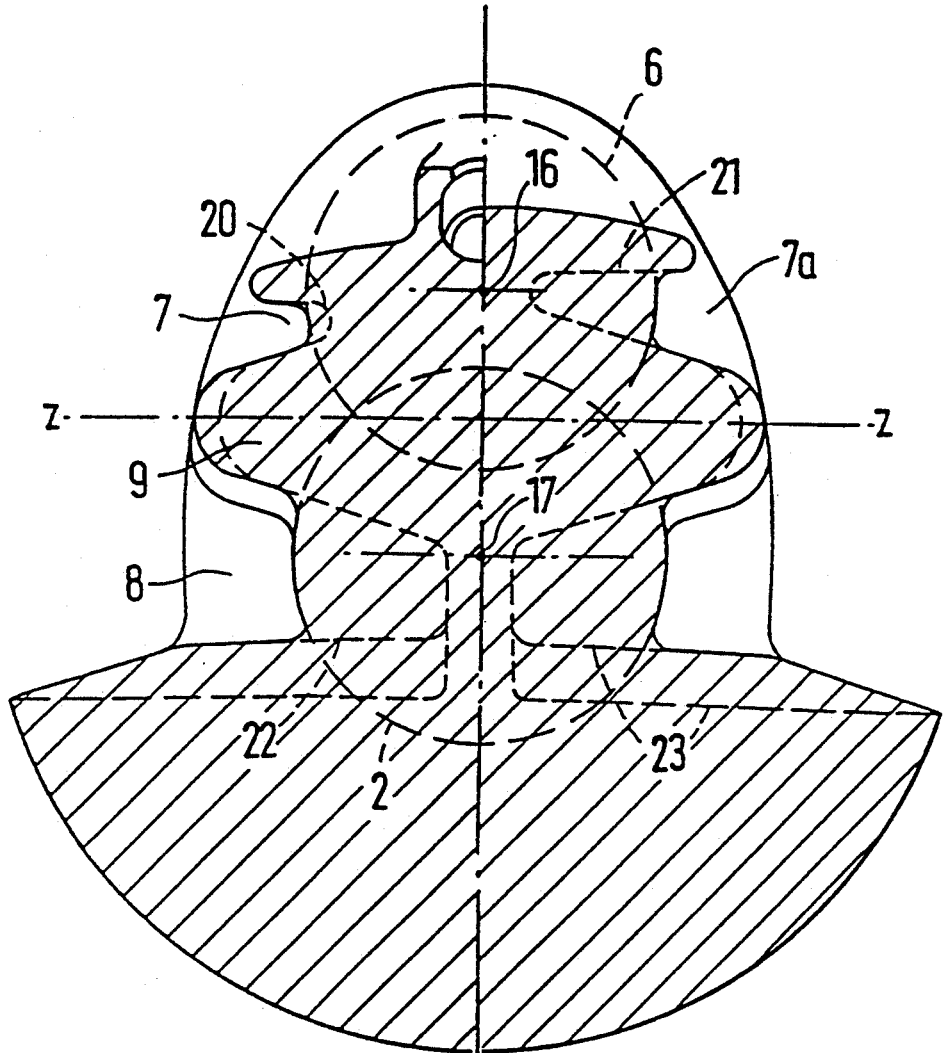
FIG. 5 is a cross-sectional view along line V—V of FIG. 4.
FIG. 6 is a cross-sectional view along line VI—VI of FIG. 4.

According to the construction of FIGS. 2 and 3, the opposite recesses 7, 8 of each crankshaft web 4, 5 have the same size and shape. According to another embodiment according to FIGS. 4, 5 and 6, these constructions may also have a size and shape which deviates from the embodiment according FIGS. 2 and 3 according to constructional requirements or stabilities. Thus, in FIGS. 5 and 6, the recess 7 in the crankshaft web 4 is smaller and has a different shape than the recess 7a of the opposite crankshaft web 5. Likewise, the recesses 7 and 8 in crankshaft webs 4 and 5 may have a different size and shape. By virtue of the interrupted lines 20, 21 for recesses 7 and 7a as well as 22 and 23 for recesses 8, the possible depths of these recesses are shown as examples. Basically, the reinforcing rib 9 is arranged with its highest point A in plane z—z which characterizes the overlapping area 11 between the connecting rod pin 6 and the journal 2.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A crankshaft for an internal-combustion engine, comprising:
    a plurality of journals and a plurality of crank pins bound by crankshaft webs;
    wherein said crankshaft webs contain recesses therein extending with a predetermined depth in a direction transversely to one of said journals and crank pins;
    said recesses ending openly in a circumferential surface of the crankshaft webs and, with respect to a longitudinal direction of the crankshaft, are bounded on both sides by remaining crankshaft web material which in this manner forms side legs having a U-profile;
    wherein each of the crankshaft webs has four of the recesses, two recesses, respectively, being disposed symmetrically opposite one another with respect to a plane containing the axes of one of the journals and crank pins which bound the crankshaft webs; and
    a reinforcing rib is arranged in an overlapping area of the crank pin and the journal between the two recesses, which are each situated on the same side of the plane.

2. The crankshaft according to claim 1, wherein the recesses are configured as flutes, and the recesses arranged in the area of the journals have a depth which extends inside an outer contour of the journal and extend on both sides of a plane which extends perpendicularly to the crank plane and through a longitudinal axis of the journals of the crankshaft.

3. The crankshaft according to claim 1, wherein the recesses are arranged radially inside a crank radius.

4. The crankshaft according to claim 1, wherein the reinforcing ribs extend to a clear outer contour of the crankshaft webs.

5. The crankshaft according to claim 1, wherein the reinforcing ribs of the crankshaft webs are arranged at an acute angle with respect to a longitudinal axis of the journal.

6. The crankshaft according to claim 1, wherein the reinforcing ribs of axially adjacent crankshaft webs extend toward one another at an obtuse angle.

7. The crankshaft according to claim 1, wherein the recesses arranged in the area of the crank pins have a smaller volume than the recesses arranged in the area of the journals.

8. The crankshaft according to claim 1, wherein the recesses of axially adjacent crankshaft webs arranged in the area of the crank pins have a different volume from the other recesses, and the volume of the other recesses are approximately equal to each other.

9. The crankshaft according to claim 1, wherein, with axially adjacent crankshaft webs, the recesses arranged in the area of the crank pins, and in the area of the journals, are approximately equal in size.

* * * * *